United States Patent
Takeda

(10) Patent No.: US 9,357,716 B1
(45) Date of Patent: Jun. 7, 2016

(54) METHOD AND APPARATUS FOR PRIMOCANE MANAGEMENT

(71) Applicant: The United States of America, as represented by the Secretary of Agriculture, Washington, DC (US)

(72) Inventor: Fumiomi Takeda, Martinsburg, WV (US)

(73) Assignee: The United States of America, as represented by the Secretary of Agriculture, Washington, DC (US)

(*) Notice: Subject to any disclaimer, the term of this patent is extended or adjusted under 35 U.S.C. 154(b) by 273 days.

(21) Appl. No.: 14/267,141

(22) Filed: May 1, 2014

(51) Int. Cl.
*A01G 9/12* (2006.01)
*A01G 1/00* (2006.01)

(52) U.S. Cl.
CPC . *A01G 9/12* (2013.01); *A01G 1/001* (2013.01)

(58) Field of Classification Search
CPC ... A01G 9/12; A01G 17/06; A01G 2017/065; A01G 17/04
USPC ...................................................... 47/46, 70
See application file for complete search history.

(56) References Cited

U.S. PATENT DOCUMENTS

| | | | | |
|---|---|---|---|---|
| 156,097 A * | 10/1874 | McDonald | ............... | A01G 9/12 256/DIG. 2 |
| 941,894 A * | 11/1909 | Stetson | ................... | A01G 9/12 47/45 |
| 950,639 A * | 3/1910 | Petzler | ..................... | A01G 9/12 47/45 |
| 3,526,993 A * | 9/1970 | Siebol | .................... | A01G 17/06 47/46 |
| 4,703,584 A * | 11/1987 | Chazalnoel | ............ | A01G 17/14 47/46 |
| 5,797,214 A * | 8/1998 | Parrish | ................... | A01G 17/06 47/46 |
| 6,973,751 B2 * | 12/2005 | Pierce, Jr. | ............. | A01G 17/06 47/46 |
| 8,424,241 B2 * | 4/2013 | Schaeffer | ............... | A01G 17/06 47/44 |
| 2003/0097788 A1 * | 5/2003 | Pierce, Jr. | ............. | A01G 17/06 47/47 |
| 2009/0277083 A1 * | 11/2009 | Barnes | .................. | A01G 17/06 47/46 |
| 2011/0154731 A1 * | 6/2011 | Schaeffer | ............... | A01G 17/06 47/45 |

* cited by examiner

*Primary Examiner* — Kristen C Hayes
(74) *Attorney, Agent, or Firm* — John D. Fado; Robert D. Jones

(57) ABSTRACT

The primocane management apparatus enables an operator to manipulate primocane-fruiting blackberries so that the primocanes are periodically bent into a horizontal configuration. The primocanes of the primocane-fruiting blackberries are managed so that the horizontally-grown primocanes produce an increased amount of fruit relative to conventionally-grown vertical primocanes.

20 Claims, 6 Drawing Sheets

METHOD AND APPARATUS FOR PRIMOCANE MANAGEMENT

FIELD OF THE INVENTION

The disclosed method and apparatus relates to a process and apparatus for increasing the production of an agricultural product. Specifically, the method and apparatus described herein relates to a trellis system and a method of manipulating blackberry primocanes to increase flower numbers and increase fruit production in primocane-fruiting blackberries.

BACKGROUND OF THE INVENTION

Most agriculturally-cultivated blackberries are known as "floricane"-fruiting blackberries. Floricane blackberries are primarily produced in Oregon, which accounted for a 2009 harvest of approximately 42.6 million pounds. The canes of floricane-fruiting blackberries have a two-year life cycle. In the first year, the canes emerge and form a vegetative structure with leaves and buds at each node of the cane. These canes must then weather a period of cold temperatures in the winter before they develop further.

In the second year of the canes' life cycle, flower shoots form from the buds that developed the previous year. At this point the canes are considered to be "floricanes" because the over-wintered canes now can develop reproductive flower shoots. The flowers on the floricanes continue to develop and eventually mature into fruit—which ripens during the summer of year two.

Although floricane-fruiting blackberries are well-suited for production in the Mid-Atlantic area, growers in the Mid-Atlantic area have been reluctant to plant floricane-fruiting blackberries because the fruit is only produced in the second year, and a harvestable crop is only produced during a relatively short time period. Additionally, floricane-fruiting blackberries are vulnerable to the long periods of extremely cold weather that sometimes strike the Mid-Atlantic, Midwest, and Northeastern United States. Extremely cold weather can severely damage or destroy mature plants. These limitations render floricane-fruiting blackberries less desirable than many competing crops which may produce multiple harvests or may continuously produce fruit throughout the growing season—and are not as susceptible to cold weather.

Recently, new varieties of blackberry plants designated as "primocane-fruiting" blackberries are being used in commercial production. Unlike the more flexible stalks of floricane-fruiting blackberries, primocane-fruiting blackberries have more rigid stalks that, left undisturbed, can grow vertically to 10 feet or more. Flowers and eventually fruit develop primarily on the ends of the vertically-extending primocane shoots. Although the primocane-fruiting blackberries develop fruit every year, the yield per plant is relatively low. To increase fruit yields, growers prune the ends (i.e. "tip") the ends of each primocane so that one or two side shoots emerge. Clusters of fruit eventually form on the emerging side shoots.

The need exists for a process that increases the amount of blackberry fruit that can be produced per season on current year's growth of primocane-fruiting blackberries. The primocane-fruiting blackberry production system described herein includes a flexible trellis that periodically reconfigures the blackberry primocanes so that the primocanes extend horizontally. The horizontally-extending primocanes produce flowers and eventually fruit along the entire length of the horizontally-extending primocanes—thereby maximizing blackberry flowering and ultimately fruit production. Further, the horizontally-extending primocanes concentrate blackberry fruit production in a zone that is near ground level rather than at the elevated heights normally seen during conventional primocane fruit production. The lower height of the fruit produced in accordance with the method and apparatus described herein enables the fruit to be harvested with conventional machinery that cannot be efficiently utilized with taller vertically extending primocanes. The lower height of the fruiting primocanes also facilitates hand-picking the fruit.

SUMMARY OF THE INVENTION

This disclosure is directed to a trellis system for producing an agricultural product, preferably primocane-fruiting blackberries and primocane-fruiting red and black raspberries. The trellis system comprises a plurality of trellises, each trellis being aligned with an adjacent trellis so that the trellis system comprises a row of trellises. Each of the trellises in the trellis system comprises an upper post member, and a lower post member. An upper trellis arm is attached to the upper post member, and a lower trellis arm is attached to the lower post member. At least two parallel upper guide wires connect the upper trellis arms of each trellis in the trellis system; and at least two parallel lower guide wires connect the lower trellis arms of each trellis in the trellis system. Multiple upper cross members extend between the two parallel upper guide wires, and multiple lower cross members extend between the two parallel lower guide wires. A pivot joint positioned between the upper and lower post members enables each of the upper post members to pivot from an upright essentially vertical position to a lowered, horizontal position.

The trellis system is structured so that when each trellis in the trellis system pivots from the upright position to a lowered position, the upper post members are positioned in tandem and primocanes growing between the two lower guide wires are sandwiched between the upper cross members and the lower cross members—thereby converting the vertically growing primocanes into horizontally-extending primocanes.

BRIEF DESCRIPTION OF THE DRAWINGS

FIG. 3 shows the original blackberry primocane in a bent/horizontal configuration as a new blackberry primocane emerges.

DETAILED DESCRIPTION OF PREFERRED EMBODIMENTS

Figure 1:
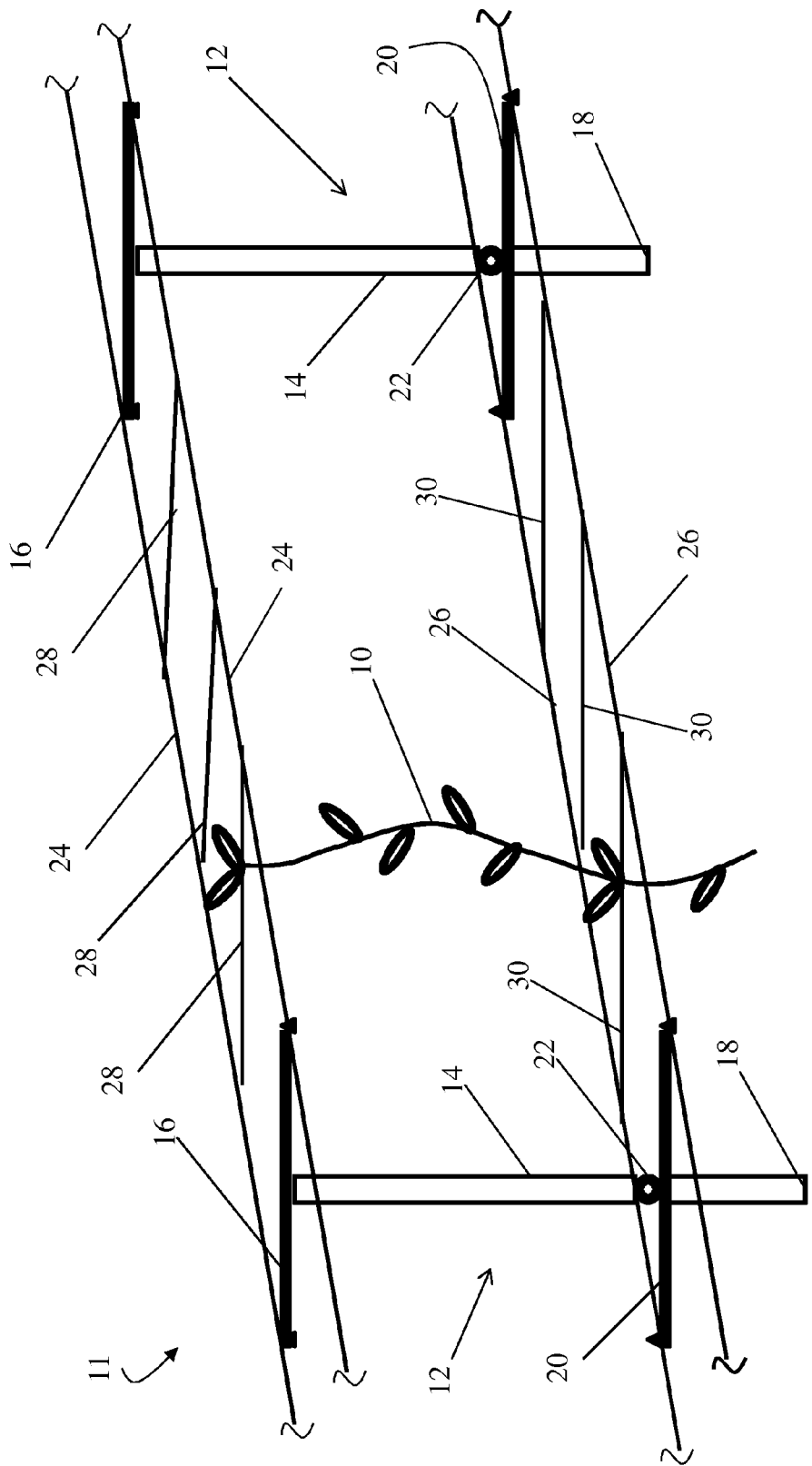
FIG. 1 is a schematic view of the inventor's trellis system in the upright position as a blackberry primocane grows adjacent to the system.

As generally shown in FIG. 1, blackberry primocanes 10 typically emerge and begin growing in a generally vertical direction. For the sake of simplicity and clarity, a single blackberry primocane 10 and a simplified trellis system 11 (comprising two associated trellises 12) are shown schematically in FIG. 1. In an actual field environment, primocane-fruiting blackberry plants 10 are typically planted about 5 feet apart and the associated trellises 12 are spaced at about 25 feet apart. A trellis system 11 (and associated primocanes 10) may be relatively short, or a row/system 11 may extend for one hundred yards or more. Each individual trellis 12 comprises at least an upper post member 14 and an upper trellis arm 16, and a lower post member 18 and a lower trellis arm 20.

As generally shown in FIGS. 1-5, the trellis system 11 generally comprises a horizontal line/row of trellises 12 connected by a network of guide wires/cables 24, 26. An upper pair of guide wires 24 is positioned at each end of the upper trellis arm 16, and a lower pair of guide wires 26 is positioned at each end of the lower trellis arm 18. In alternative embodiments, there may be more than or less than two upper 24 and lower 26 guide wires, and the guide wires 24, 26 may be spaced as required along the upper 16 and lower 18 trellis arms.

The trellis system 11 also includes multiple upper cross-members 28 and lower cross-members 30. The upper cross-members 28 connect parallel upper guide wires 24, and the lower cross-members 30 connect parallel lower guide wires 26. Although FIG. 1 shows only a few upper 28 and lower 30 cross-members, many more cross-members 28, 30 may be present, as required by the volume and structure of the primocanes 10. The cross-members 28, 30 may be essentially cross-wires/cables, or they may comprise arching or non-arching non-wire/cable structural members.

Figure 2:
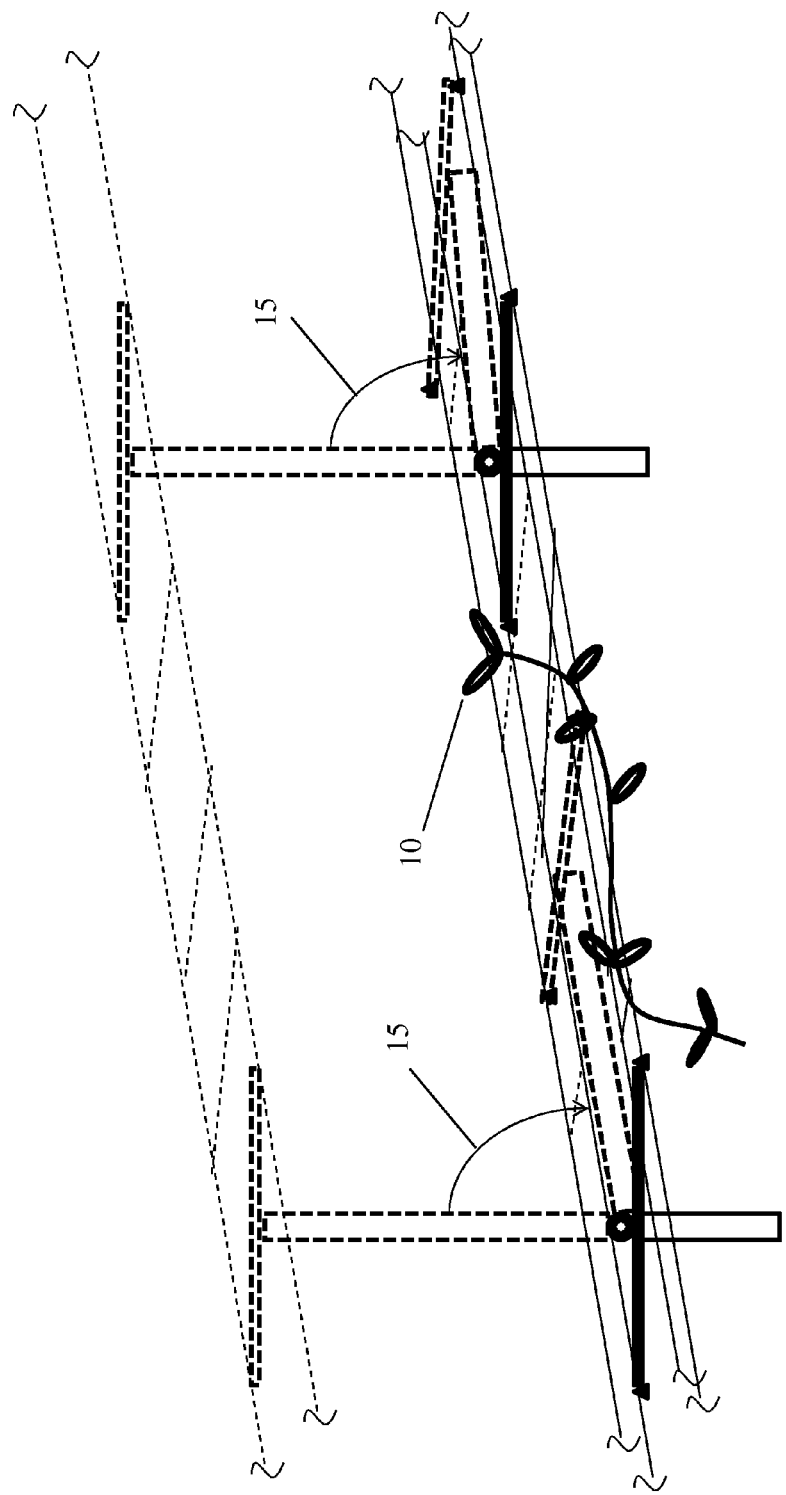
FIG. 2 is a schematic view of the inventor's trellis system as the system is pivoted from an upright position to a lowered position and the blackberry primocane is bent so that the primocane grows in an essentially horizontal direction, with the upper portion of the trellis being shown in dashed lines.
Figure 3:
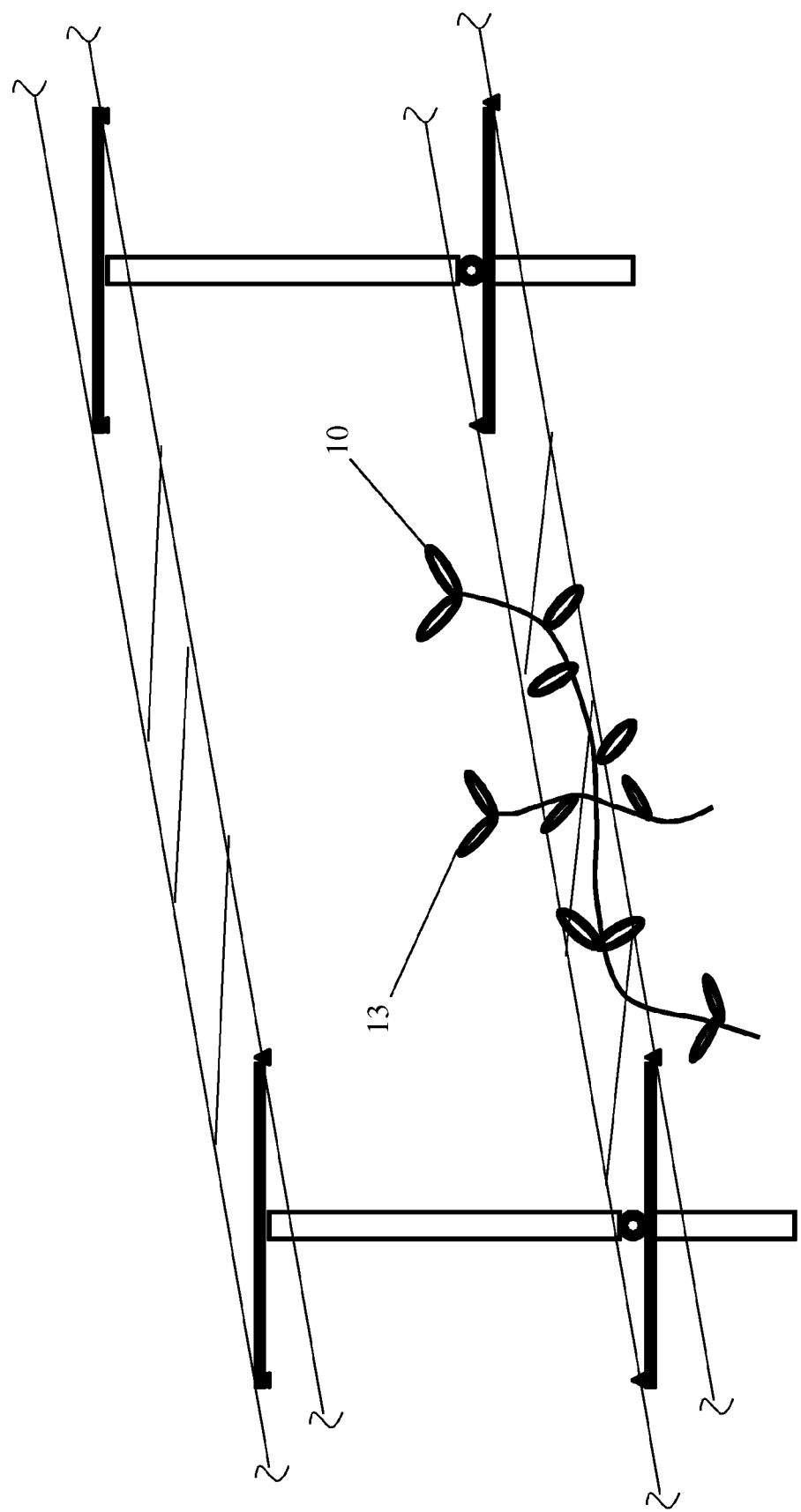
FIG. 3 is a schematic view of the inventor's trellis system after the system has been returned to an upright position.
Figure 4:
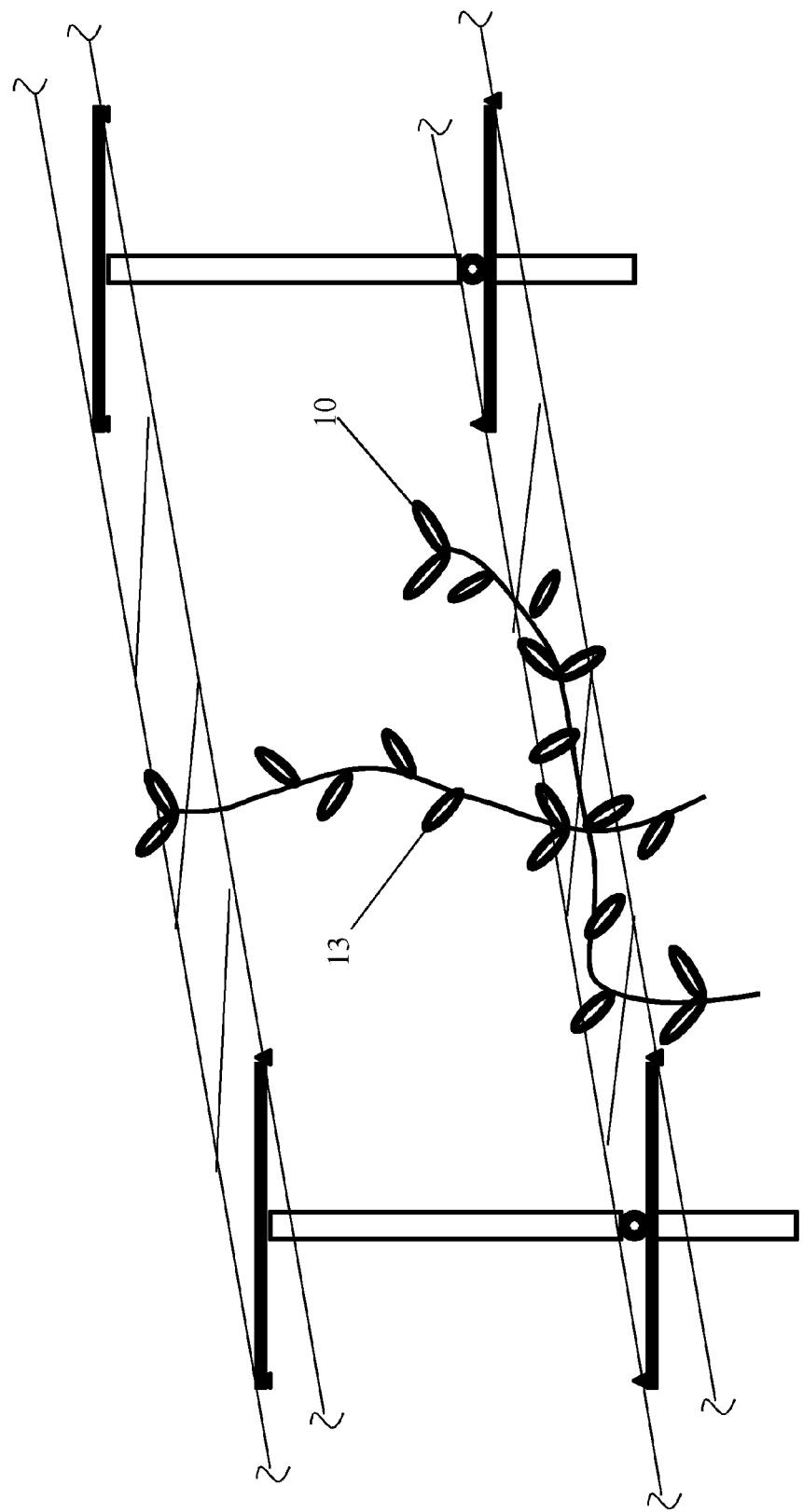
FIG. 4 is a schematic view of the inventor's trellis system wherein the new blackberry primocane has grown to an upper portion of the trellis.
Figure 5:
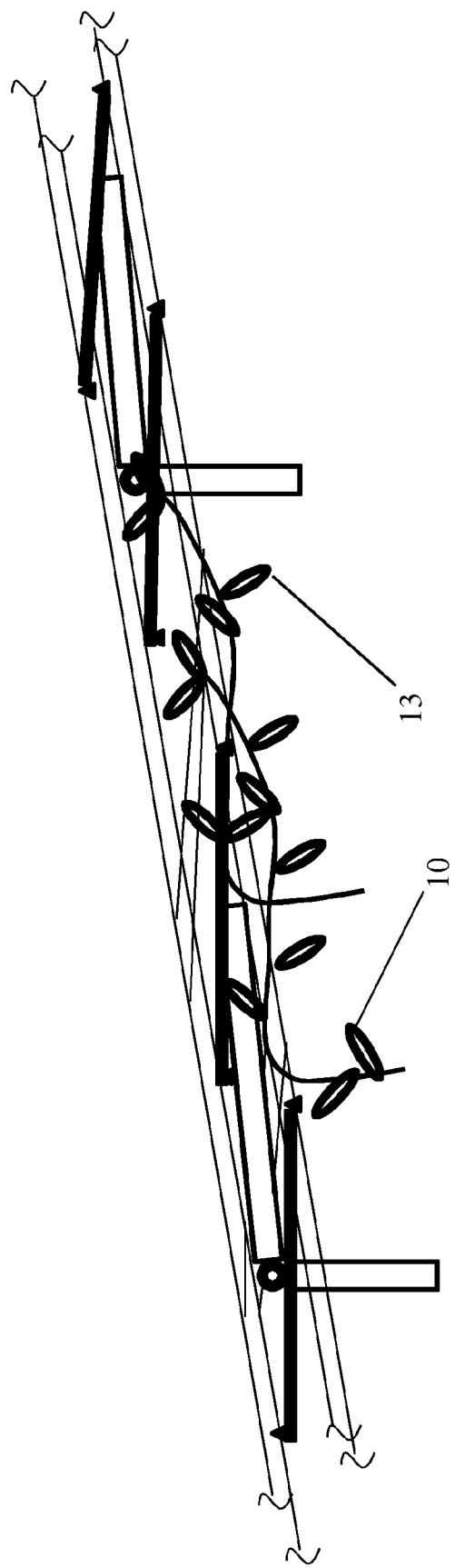
FIG. 5 is a schematic view of the inventor's trellis system with the trellis system pivoted to a lowered position so that both new and original blackberry primocanes extend horizontally.

As shown in FIG. 2, a flexible pivot joint 22 is positioned between the upper 14 and lower 18 post members. The pivot joint 22 enables an operator to pivot the upper post member 14 in the direction of the arrow 15 to a lowered position. Specifically, as shown in FIG. 2, the pivot joint 22 enables each trellis 12 to pivot so that the upper post member 14 moves from an essentially upright vertical position (as shown in FIGS. 1, 3, and 4) to a lowered position (as shown in FIGS. 2 and 5 (FIG. 6 does not show the upper portion 14, 16, 24, 28 of the trellis system 11). The pivot joint 22 is designed so that, as the upper post member 14 pivots in a direction parallel with an associated row of primocanes 10, the upper guide wires 24 swing down to a position adjacent to the lower guide wires 26.

As shown in FIGS. 2 and 5, as the upper post members 14 pivot downwardly, the upper cross members 28 catch and deflect any vertically extending primocanes 10 so that the primocanes 10 are bent and thereby repositioned to extend horizontally, without causing injury to the plants or primocanes. In the lowered position, the pivoted upper post members 14 form a generally horizontal line that is aligned with, and parallel to—a row of primocanes. Essentially, in the lowered position, the upper post members 14 are positioned in tandem, with the top of each upper post member 14 generally pointing toward the bottom of the next (adjacent) upper post member 14.

In an actual field environment, once the trellis 12 is moved from an upright vertical position to a lowered position (as shown in FIGS. 2 and 5), the trellis 12 is generally left in the lowered position for a "repositioning period". The repositioning period is one day or more, but is typically less than a week. During the repositioning period, the primocanes 10 that are sufficiently tall are attached to one of the lower guide wires 26 or to one of the lower cross members 30. At the end of the repositioning period, the trellis system 11 (and consequently each individual trellis 12) is returned to the upright vertical position.

In the preferred embodiment, a mechanical cable winching system (not shown) is used to pivot and resurrect the upper portions 14, 16, 24, 28 of the trellises 12 so that all connected trellises 12 pivot in unison. In alternative embodiments, the trellises 12 may be raised and/or lowered individually or in subgroups. In the preferred and/or alternative embodiments, any means known in the art may be used to effect the trellis/trellis system movement.

In operation, as best shown in FIG. 1, as vertical blackberry primocanes 10 emerge, the primocanes 10 grow past the lower guide wires 26 in the direction of the upper guide wires 24. As shown in FIG. 2, after the primocanes 10 reach about the height of the upper guide wire 24, an operator pivots the trellis system 11 so that the upper post member 14 swings downwardly in the direction of the arrow 15 from an essentially upright position (shown by the FIG. 2 vertical dashed trellis 12 outline) to a lowered position (shown by the lowered dashed outline).

As shown in FIG. 2, when the upper post member 14 is lowered, the upper cross-members 30 catch any upright primocanes 10 and bend them down so that the primocanes 10 are aligned parallel with the pivoted upper post members 14. When the upper post members 14 are lowered, the primocanes 10 are sandwiched between the upper 28 and lower 30 cross members. In the preferred embodiment, the trellis system 11 remains in the lowered position for a repositioning period.

While the trellis system 11 is in the lowered position, a technician weaves (or otherwise attaches) the primocanes 10 over and/or under the lower cross-members 30 so that the priomcanes 10 are secured in an essentially horizontal position extending parallel with the row of primocanes 10. Once the original primocane 10 is secured and growing in the horizontal position, an operator raises the trellis system 11 back to the upright position so that the upper post member 14 is once again in an essentially vertical position. As shown in FIG. 3, once the trellis system 11 is in the upright position, new primocanes 13 emerge while the original primocane 10 remains in a bent position and is trained to essentially grow horizontally.

As shown in FIG. 4, eventually the new primocane grows past the lower guide wire 26 and attains a sufficient height to warrant bending the new primocane 13 to grow horizontally. As shown in FIG. 5, once again the trellis system 11 is pivoted so that the new primocane 13 is bent to an essentially horizontal position. The horizontal primocane 13 is weaved around the lower cross-member 30 or otherwise secured to a lower guide wire 24 so that the new primocane 13 is retained in the bent position. After the repositioning period, the trellis system 11 is once again returned to the upright position (as originally shown in FIG. 1) and the cycle starts over. The cycle is repeated continuously throughout the growing season as long as new vertical primocanes emerge.

Figure 6:
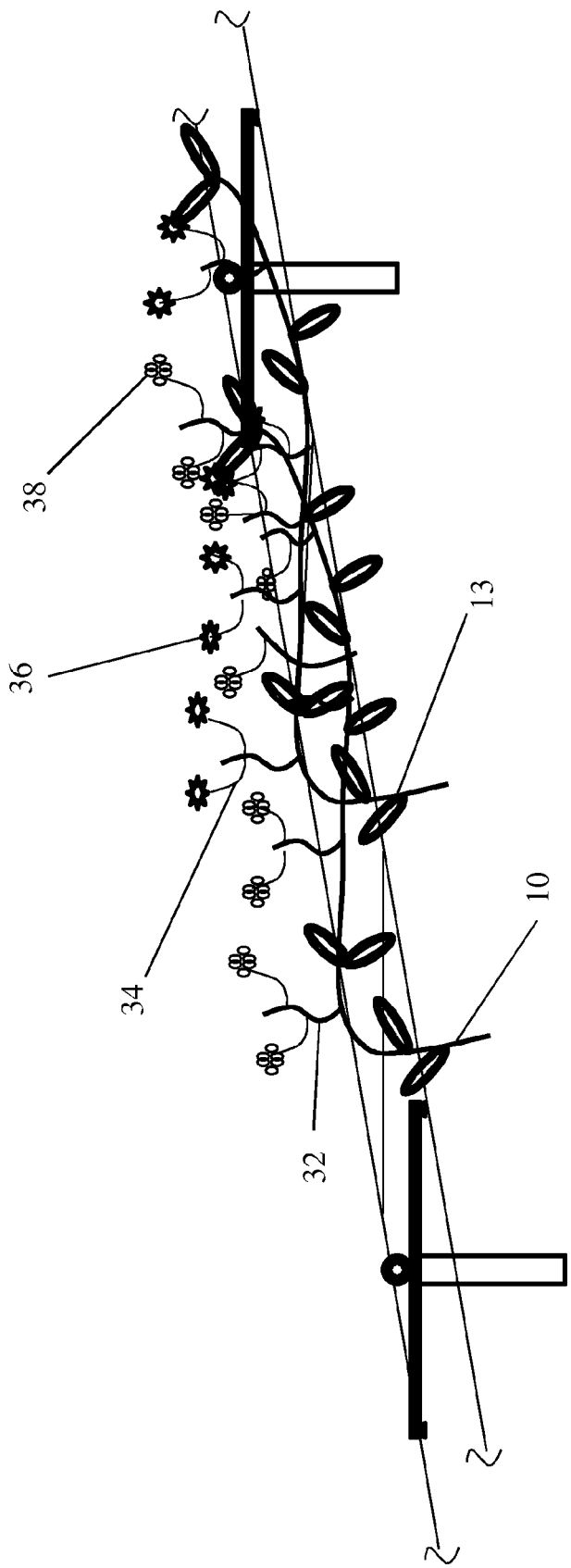
FIG. 6 is a schematic view of two exemplary blackberry primocanes showing fruit (on the original primocane) and flowers (on the new primocane) produced after a technician has "tipped" the horizontally extending primocanes as well as vertical shoots emerging from the primocane.

FIG. 6 is an exemplary illustration of mature primocanes 10, 13 that have reached the flowering and fruit development stage. Note that, for the sake of simplicity, the upper portion 14, 16, 24, 28 of the trellis 12 is not visible in FIG. 6.

As shown in FIG. 6, after the primocanes 10, 13 are established in the horizontal position, vertical shoots 32 emerge from the primocanes 10, 13 and are "tipped" i.e. the shoots 32 are cut near a distal end by a technician. Secondary lateral shoots 34 form shortly thereafter and then (about 5 weeks later) flowers 36 emerge. Fruit develops about 6 weeks after the flowers appear. The inventors have found that flower (and ultimately fruit) production is significantly increased by tipping the vertical shoots 32 of horizontally-extending primocanes 10 relative to conventional fruit production by non-tipped vertically-extending primocanes.

Further, in accordance with the process described herein, fruit production is concentrated at a lower height above ground, thereby facilitating harvest of the fruit. In conventional systems with vertically-grown primocanes, fruit production areas may comprise a zone extending from just above ground level to a height of eight feet or more. With conventionally-grown blackberries it is difficult to use vine-shaking machines when the fruit is elevated more than a few feet because of the increased likelihood of bruising the fruit during the harvesting process. Similarly, concentrating the fruit at a lower level simplifies the manual harvesting process where the crop is hand-picked. Concentrating the fruit at a lower level significantly increases the potential scope of harvesting methods to include techniques that are currently used with other crops such as blueberries and other vine/cane-based fruits.

For the foregoing reasons, it is clear that the method and apparatus described herein provides an innovative method of maximizing blackberry production throughout a growing season. The current system may be modified in multiple ways and applied in various technological applications. The disclosed method and apparatus may be modified and customized as required by a specific operation or application, and the individual components may be modified and defined, as required, to achieve the desired result.

Although the materials of construction are not described, they may include a variety of compositions consistent with the function described herein. Such variations are not to be regarded as a departure from the spirit and scope of this disclosure, and all such modifications as would be obvious to one skilled in the art are intended to be included within the scope of the following claims.

What is claimed is:

1. A trellis system for producing an agricultural product, the trellis system comprising a plurality of trellises, each trellis being aligned with an adjacent trellis so that the trellis system comprises a row of trellises, each trellis comprising:
    an upper post member, and a lower post member;
    an upper trellis arm attached to the upper post member, and a lower trellis arm attached to the lower post member;
    at least two parallel upper guide wires connecting the upper trellis arms of each trellis in the trellis system; and,
    at least two parallel lower guide wires connecting the lower trellis arms of each trellis in the trellis system;
    a plurality of upper cross members extending between the at least two parallel upper guide wires;
    a plurality of lower cross members extending between the at least two parallel lower guide wires; and
    a pivot joint enabling each of the trellises to pivot from an upright essentially vertical position to an essentially horizontal lowered position;
    wherein as each trellis in the trellis system pivots from the upright position to the lowered position, the upper post members are positioned in tandem and primocanes growing between the at least two lower guide wires are sandwiched between the upper cross members and the lower cross members so that the primocanes are bent horizontally.

2. The trellis system of claim 1 wherein the agricultural product comprises blackberries or red or black raspberries.

3. The trellis system of claim 1 wherein the agricultural product comprises primocane-fruiting blackberries.

4. The trellis system of claim 1 wherein the pivot joint is positioned between the upper post member and the lower post member so that the lower post member stays stationary as the upper post member pivots.

5. The trellis system of claim 1 wherein the system is structured so that at the end of a repositioning period, the upper post member is capable of being returned to an essentially vertical upright position.

6. A method of producing an agricultural product comprising the steps of:
    (a) providing the trellis system of claim 1;
    (b) pivoting the trellis system so that the primocanes are in an essentially horizontal configuration;
    (c) connecting the primocanes to the lower guide wires or to the lower cross members; and,
    (d) returning the trellis system to an upright position
    (e) producing the agricultural product from the primocanes connected to the lower guide wires or lower cross members.

7. A system of producing fruit comprising a trellis system arranged in a linear row, the trellis system being structured so that as an upper portion of each individual trellis in the trellis system pivots from an upper vertical position to a lowered horizontal position, an upper portion of a vertical plant is bent to extend horizontally parallel with the linear row and with the upper portion of each individual trellis.

8. The system of claim 7 further comprising an upper cross member associated with the upper portion of each individual trellis, wherein the upper cross member bends the upper portion of the vertical plant to extend horizontally.

9. The system of claim 8 further comprising a lower cross member, the upper portion of the vertical plant being sandwiched between the upper and lower cross members when the vertical plant is bent to extend horizontally.

10. The system of claim 7 wherein, in the lowered position, the upper portion of each individual trellis extends horizontally and in tandem with an upper portion of an adjacent trellis.

11. The system of claim 7 wherein the fruit is blackberries.

12. The system of claim 7 wherein the vertical plant is a primocane-fruiting blackberry.

13. A method of producing blackberries, the method comprising the steps of:
    (a) providing a plurality of trellises, each trellis comprising an upper portion and a lower portion;
    (b) connecting the plurality of trellises with at least two upper and two lower horizontal guide wires;
    (c) connecting each of the at least two upper and two lower guide wires with a plurality of cross members, the cross members extending horizontally between the at least two upper guide wires, and between the at least two lower guide wires, respectively;
    (d) growing vertical plants between the trellises;
    (e) pivoting an upper portion of the trellises when the vertical plants achieve a predetermined height, wherein as the upper portion of the trellises pivot, the vertical plants are bent into a horizontal position by the plurality of upper cross members.

14. The method of claim 13 wherein, in step (e), when the vertical plants are bent into the horizontal position, a portion of the vertical plants is sandwiched between the upper and the lower cross members.

15. The method of claim 13 wherein, in step (d), the vertical plants are primocane-fruiting blackberries.

16. The method of claim 13 wherein, in step (e), the upper portion of the trellises are pivoted so that the upper portion of each of the trellises extends horizontally and in tandem with an upper portion of an adjacent trellis.

17. The method of claim 13 further comprising step:
(f) waiting a repositioning period of at least one day, and then attaching a portion of each vertical plant to a lower cross member or a lower guide wire.

18. The method of claim 17 further comprising step:
(g) returning the upper portion of the trellis to a vertical position.

19. The method of claim 18 further comprising step:
(h) tipping the end of the (now bent) vertical plant so that vertical sprouts emerge.

20. The method of claim 19 further comprising step:
(i) tipping the ends of the vertical sprouts so that lateral shoots emerge.

* * * * *